United States Patent
Andersson et al.

(10) Patent No.: US 6,694,513 B1
(45) Date of Patent: Feb. 17, 2004

(54) METHOD OF INTEGRATING AN APPLICATION IN A COMPUTERIZED SYSTEM

(75) Inventors: Johan Andersson, Västerås (SE); Mikael Rudin, Västerås (SE)

(73) Assignee: ABB AB, Vasteras (SE)

( * ) Notice: Subject to any disclaimer, the term of this patent is extended or adjusted under 35 U.S.C. 154(b) by 0 days.

(21) Appl. No.: 09/348,017

(22) Filed: Jul. 6, 1999

(51) Int. Cl.[7] .................................................. G06F 9/45
(52) U.S. Cl. ........................................ 717/165; 717/167
(58) Field of Search ................................. 717/165, 167, 717/116

(56) References Cited

U.S. PATENT DOCUMENTS 6,134,559 A * 10/2000 Brumme et al. ......... 707/103 R
6,269,373 B1 * 7/2001 Apte et al. .................... 707/10

FOREIGN PATENT DOCUMENTS

WO 9722925 6/1997 ............. G06F/9/44

OTHER PUBLICATIONS

Hauck et al., AspectIX An Aspect Oriented and Corba Complient ORB Architecture, Friedrich–Alex. Univ., p. 1–8.*
Hauck et al., AspectIX A Middleware for Aspect Oriented Programming, Friedrich–Alex. Univ., p. 1–5.*
Kiczales et al., Aspect Oriented Programming, ACM, p. 1–6.*
Kiczales et al., Aspect Oriented Programming, Springer–Verlag, p. 1–25.*
Zinky et al., Architectural Support for Quality of Service for Corba Objects, BBN Sys & Tech, p. 1–29.*
Zinky et al., Quo's Runtime Support for Quality of Service in Distributed Objects, p. 1–29.*
Microsoft Press, Microsoft Press Computer Dictionary, 3rd ED., Microsoft Press, p. 121.*
"Components" by Steve Robnson snd Alen Keassel, Panther Software, Aug. 8 1997; URL:http://www.pantersoft.com/, pp. 1–29.

* cited by examiner

Primary Examiner—John Chavis
(74) Attorney, Agent, or Firm—Dykema Gossett PLLC

(57) ABSTRACT

A method of integrating an application in a computerized system for representing a real world object, and a system employing the method. The real world object may be any object, device, process or item of equipment, including equipment in industrial or commercial installation or process, in any location. The real world object is represented as an object, called a Composite Object, in a part of a computer program. The invention also includes Aspects which represent the data and/or operations of a Composite Object. The Composite Object is a container holding at least one Aspect representing data for the real world object. The Composite Object includes at least one interface for use by another object which interface is implemented by the Aspect System and accessed through an object Request Broker, that complies, for example, with COM. The principal advantage of the method and system is that applications within the system do not require prior information about other objects or applications included in the system. Modular and simplified expansion of the system is enabled, together with the later integration of applications not specified at the time of designing the system.

46 Claims, 3 Drawing Sheets

METHOD OF INTEGRATING AN APPLICATION IN A COMPUTERIZED SYSTEM

TECHNICAL FIELD

The present invention is concerned with computerized systems for control. In particular the present invention is a method for integrating many and varied types of application within a computerized system, and a system employing the method. The method and system may be used in a computerized system for controlling single devices, an object in a process, complete equipment, in any location including a home, as well as processes or industrial installations such as steel mills, paper mills, and automated factories.

BACKGROUND ART

In contemporary computer based systems for controlling manufacturing and process industries, such as chemical plants, oil refineries, pulp and paper mills, steel mills, etc., there has typically existed a large range of different applications of different origin that have had to be integrated into a single control system. Further, a control system typically includes several computers connected through a communication network, where said applications are distributed in different configurations for different installations. Traditional methods for this integration have entailed extremely lengthy development times resulting, for example, in significant changes in requirements before such control programs have been completed and made ready for use. A second problem with traditional development methods is that it has been difficult and lengthy to update such control programs to include new requirements, such as the integration of additional and new applications. Writing and modifying control system programs to combine newer applications with older, existing applications, which older applications are sometimes called legacy applications, has also been difficult, time consuming and expensive.

The adoption of object-oriented programming languages and methods has led to somewhat shorter development times, and made it somewhat easier to incorporate or integrate new applications.

IEC standard DIS ISO/IEC 1346-1 1995 Structuring principles and reference designations, contains a reference designation system for the unambiguous identification of parts of any system in the general technical context such as in a manufacturing company, plant or operating company. Within this description the terms object, aspect and reference designations in particular are used to refer such parts of any system in the general technical context in accordance with the definitions in DIS ISO/IEC 1346-1.In addition, certain additional types of objects and aspects will be additionally defined in the course of this description.

U.S. Pat. No. 5,787,425 describes a concept of client/server relationships between objects in an object-oriented computer program. Objects communicate with each other, for example in order for a first object to access data held by a second object. When the first object needs access to some data controlled by the second object, the first object is considered to be a client of the second object, which in turn is considered to be a server. To access the data controlled by the server object, the second object in this example, one of the operations of the first object, the client object, will call or invoke one of the operations of the server object. The operation of the server object thus invoked is then executed to access and/or manipulate the data on behalf of the client object.

When the client object and server object both exist and run in the same process (memory space) in the same computer, the server object is described as being "in process". When the client and server objects run in different processes (memory spaces) in the same computer, the server object is described as being "local". When the client and server objects run in separate computers, the server object is described as being "remote".

The standard operation of an Object Request Broker (ORB) is to handle requests between client and server objects. The ORB makes the handling of requests transparent to the client object whether the server object is in process, local or remote.

A known example of an ORB is published by Microsoft and is called Component Object Model (COM). It is a standard for interoperability between software components introduced in 1993. COM is independent of programming language and supported by many widely used computer operating systems such as Windows, Mac OS, and many types of Unix. It uses a single model for software components to communicate with each other, both inside the same computing process and also across process and network boundaries. COM is also associated with ActiveX (Trademark), a system of software controls that use COM technologies. The COM standard of 1995 is described in The Component Object Model Specification available in the Microsoft MSDN Online Library on the web site maintained by Microsoft. Additional information about COM may be found in, amongst others, an article in Dr. Dobbs Journal December 1994 entitled The Component Object Model: Technical Overview.

The adoption of object oriented programming and client-server approach has provided design tools that make it easier to design computerized systems with re-useable modules that co-operate in a standardized way to perform the collective functions of the system. However, it is necessary to integrate applications of different origin, that are implemented using different object and non-object technologies, including new applications, as well as applications that were anticipated but not known in detail at the time of planning a computerized system. Conventional system design requires that an object in a computerized system has prior information about an application in order for the object to, for example, access a method implemented by the application. A new way to design systems is required to integrate applications, such that different applications can be both fully independent, based on different technologies, and without knowledge of the specifics of each other, and at the same time able to co-operate with each other to perform the collective functionality of the computerized system.

SUMMARY OF THE INVENTION

An object of the invention is to provide a method to integrate an application in a system for computerized control of a real world object, and a system in which the method is employed. Another object of the invention is a method to integrate an application such that prior information about the application need not be specified. Another object of the invention is to provide a method to represent real world objects in a computerized system in a systematic way, in which different types of information about the real world object may be obtained, linked to the real world object, processed, displayed and acted on, and a system employing same. Another object of the invention is the integration of a large range of applications within the system in a modular manner. Another object of the invention is to provide a method for the integration of later and additional applications into an existing system. Another object of the invention is to provide for the integration of different applications that are implemented using different object and non-object oriented technologies. Another object of the invention is to provide a system and method in which separate applications that are independent and without knowledge about the specifics of each other, are able to co-operate to jointly provide system functionality that is associated with said real world objects. A further object of the invention is to provide a method and system in which control of equipment may be achieved in any location including a home or residence.

These and other objects are achieved according to the present invention by a method as described in claim 1 and a system as described in claim 14, and a computer program product described in claim 27. The present invention may be described summarily as a method for designing a computerized system, and a system employing same method, in which one or more real world objects are represented by an object called a Composite Object. The Composite Object is a part of a computer program included in the computerized system. One or more facets of the real world object, such as a physical location, a stage in a process, a control function, an operator interaction, a simulation model, some documentation about the object, etc are described as one or more Aspects of the Composite Object. A central feature of the present invention is that each Composite Object is a container for one or more Aspects of the real world object which represent the real world object.

An important new and useful element of the present invention lies in that different applications may be used to implement different Aspects or groups of Aspects of a Composite Object. Each application defines interfaces that are independent of the implementation of the application itself. These interfaces may be used by other applications, implementing other Aspects or groups of Aspects of the Composite Object, such that the applications can co-operate to provide a functionality that is the sum of all Aspects, i.e. the functionality of the Composite Object. The interfaces are specified as COM interfaces, where COM interfaces are implemented by COM objects as described above. The interfaces may be in-process, local, or remote. Internally, each application may use any object oriented technology, such as C++ or Java, or non-object oriented technology such as relational databases, sequential files, etc.

Many different types of application may be used to implement Aspects. For example a word processing program may be used by one Aspect to display a functional specification, and by another Aspect to edit operator notes. Similarly a CAD program may be used by an Aspect to display a drawing, and used by another Aspect to display an electrical diagram or by a third Aspect to display a piping and instrumentation diagram. Application programs are not limited in any way to those programs used in traditional process control methods. For example a production management application may be used by one Aspect to display a job order, by another Aspect to run an equipment schedule or by a third Aspect to show material in stock.

The principal advantage of the present invention is that a large range of applications may be integrated into a computerized system in a modular and independent fashion. Each application is, by means of Composite Objects and Aspects contained by Composite Objects, responsible for its own data and operations. This means that applications that are internally based on different object or non-object oriented implementation technologies can be integrated in such a way that no difference is apparent between the methods for supplying services provided by the different applications. This also means that modifying an application or adding an application requires no change to other applications in the system. This is a particularly useful feature of the present invention because it facilitates the addition of new Composite Object types which may require addition of new Aspects, including new applications to manage these new Aspects. Another advantage of the invention is that Aspects of a Composite Object provide a method to indicate inheritance which enables Composite Objects to inherit certain Aspects automatically without necessarily defining inheritance relationships between specific Composite Objects.

The present invention thus provides important benefits in several respects including: i) for the developer of a system, who can integrate existing, new, and future possibly not yet anticipated applications, without having to significantly rewrite every application to fit with any particular data model or implementation technology, ii) for the user of the system, who will perceive a seamless integration of vastly different applications that co-operate to provide the full functionality that is associated with the real-world entities that he or she is dealing with and iii) for the owner of the system whose investment is protected because the system may be developed with, or extended by, applications not previously anticipated.

The applicability of the present invention is not limited to traditional process control functions and use, but extends as well to many other areas. This includes business and commercial activities such as production management, design and maintenance systems, and business and financial systems. It also includes control of equipment in other locations including equipment or processes in a residence or a home.

BRIEF DESCRIPTION OF THE DRAWINGS

The present invention will be described in more detail in connection with the enclosed drawings.

DESCRIPTION OF THE PREFERRED EMBODIMENTS

Figure 1:
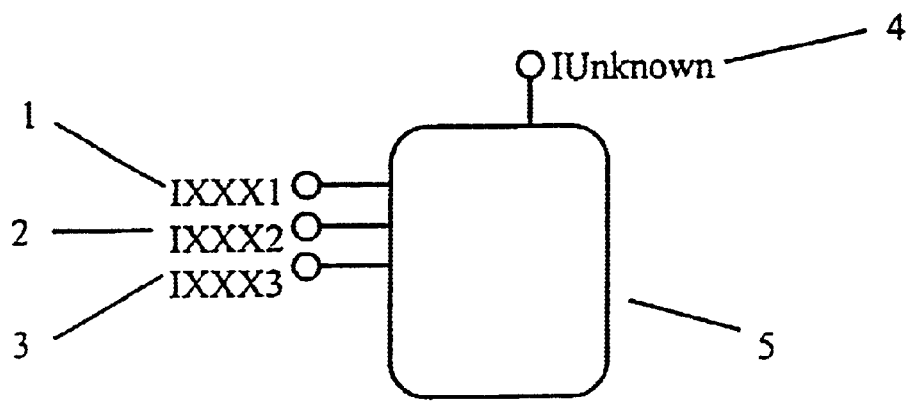
FIG. 1 shows schematically a COM Object with interfaces according to a known standard, COM.

FIG. 1 shows a COM object 5 with three known interfaces 1, 2, 3, and a standard interface 4, which interface is known within the COM model as Iunknown. COM is an existing standard.

In order to facilitate understanding of the invention, it is necessary to explain some details of about COM. Development of computerized systems using COM aims at developing one or more COM objects. The COM object provides its services via methods, which are grouped into one or more interfaces. Each interface, such as interfaces 1–3 of FIG. 1, typically includes methods that supply a specific range of services. Through these interfaces, a client object can invoke the methods defined by the COM object. The set of interfaces that are supported by a specific COM object may change as the object undergoes revisions and updates, but any interface once defined always stays the same. In this way problems with versions and backwards compatibility are minimized. All COM objects support an interface which is named IUnknown. This interface controls the life time of the object (through reference counting) and allows client objects to obtain information about other interfaces supported by the object. The convention of Iunknown thus allows COM objects to interact without each object previously having information about every possible interface that may be supported by every other object. FIG. 1 illustrates a COM object 5 with several interfaces, which interfaces always include an instance of IUnknown. A client object can query a standard COM object 5 for an interface, but in order to do that, the client object has to know the identity of the object (or application) for which it is seeking an interface. If the object supports the interface then a reference to the interface is returned as some form of pointer to where that interface may be found.

COM is a published standard and as such is a part of the prior art.

In a method to integrate an application in a computerized system for control of a real world object and a system using same method according to an embodiment of the present invention, a Composite Object represents any real world object. The real world object may be an actual object such as a pump, a motor, a valve, etc., or a more abstract object such as a purchase order, production batch, etc. The present invention is not limited to traditional control or process control areas. Any real world object may be represented, as an object in a process, including a device or process in a home for example, or a person carrying out a stage or role in a process, or intangible objects such as messages, a location, status of information etc.

Figure 2A:
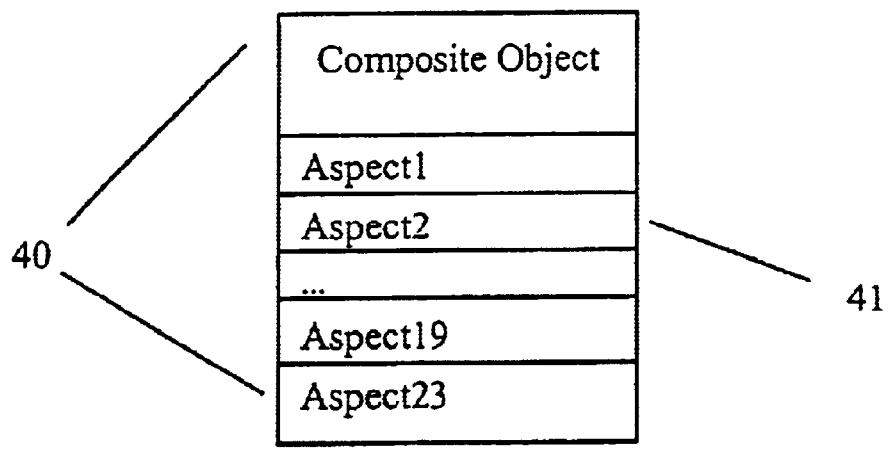
FIG. 2a shows schematically a Composite Object and Aspects according to an embodiment of the present invention.

Referring to FIG. 2a, which shows a Composite Object 40 and some Aspects 41. The Composite Object 40 is a container, holding different Aspects1, 2, 19, 23 etc. related to the real world object. An Aspect represents one facet of the real world object, and is responsible for all operations on that facet of the object and its data. Thus for a pump for example, one Aspect could represent a physical location, another Aspect could represent a blue print diagram of the pump, another represents a security descriptor for the pump, another Aspect represents a control for an operation of the pump and yet another Aspect represents documentation about the pump. The Aspect that represents the facet has an association to a function of an application that can, referring to the above example, display the blue-print diagram, or control the operation of the pump.

Composite Objects and Aspects communicate with each other using a "framework" based on an Object Request Broker such as COM with additions defined according to the present invention. A set of interfaces are defined to allow Aspects to co-operate using standard services. Any individual Aspect may define additional interfaces, to allow for any specific interaction that may be required within a subgroup of Aspects.

In an embodiment of the present invention, each of the real world objects represented in the system is represented within a computer program as a Composite Object. In order to do this the computer program contains software code means to direct a computer to carry out functions according to an embodiment of the present invention. The Composite Object contains one or more Aspects representing facets of the real world object that the Composite Object represents. These Aspects also have associations to applications that provide functionality that is associated with the respective facets of the real-world object.

All Aspects are created through an Aspect Category. The Aspect Category contains information that is shared between all instances of the category. Each Aspect Category refers to one Aspect Type. This Aspect Type describes the implementation of an Aspect.

An Aspect belongs to an Aspect Type (through its category) which lists the set of COM objects that implements the functionality of the aspect. This implementation is provided by an object, referred to as an Aspect System Object (ASO), which is a COM compliant object. Stated differently, the Aspect Type contains the binding information between an Aspect and the one or more applications that implement its functionality.

The Composite Object may be queried by a client, through an Object Request Broker such as COM, to find a reference for an interface of the application associated with any of its Aspects.

An Object Request Broker such as COM provides a mechanism to communicate a reference for a particular interface. The "framework" provided by Composite Objects and Aspects provides the means to identify the particular interface that the Object Request Broker subsequently communicates.

Figure 2B:
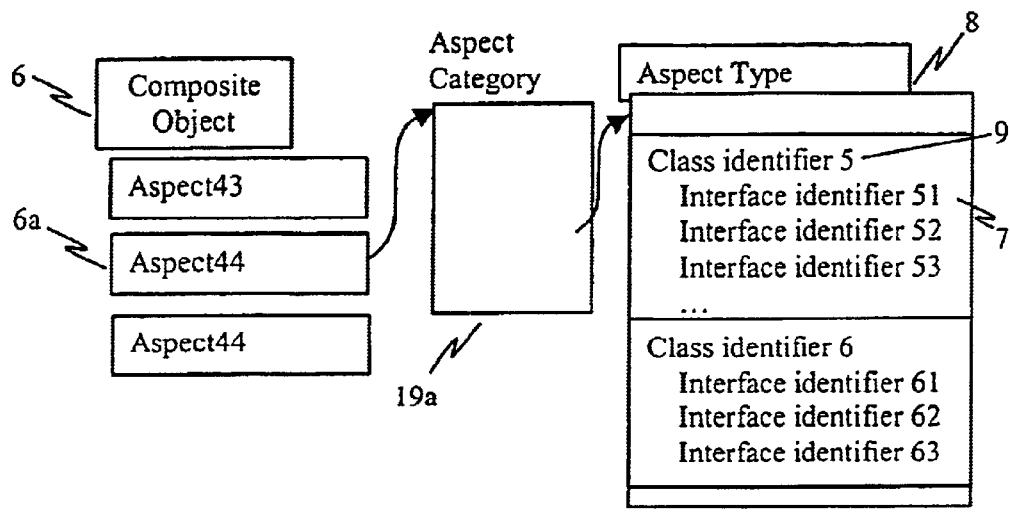
FIG. 2b shows schematically an Aspect Type of an Aspect according to an embodiment of the present invention.
Figure 3:
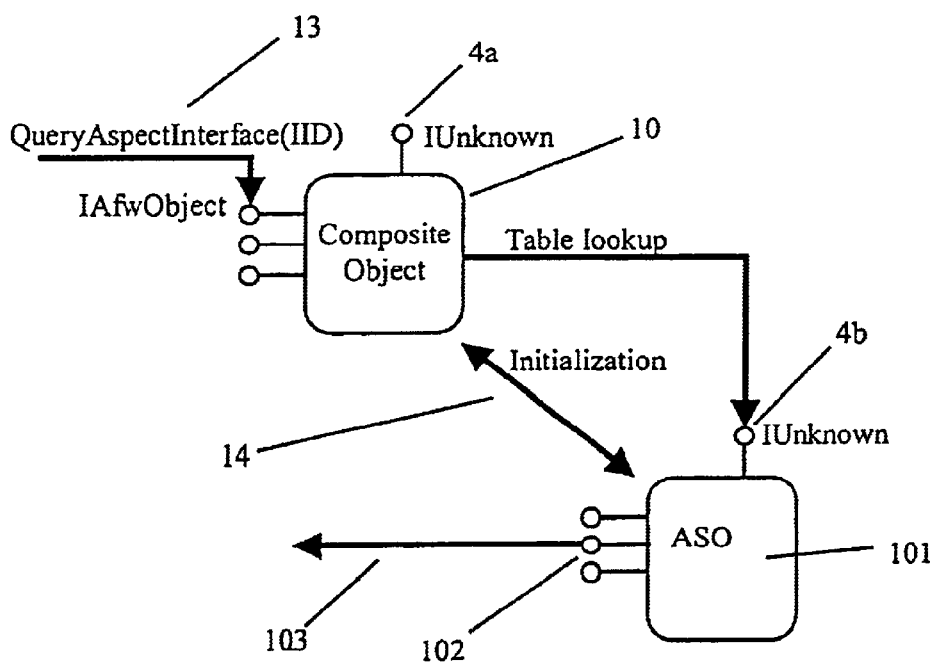
FIG. 3 shows schematically the handling of a query by a Composite Object through an Aspect Type according to an embodiment of the present invention.

See FIGS. 2b and 3. FIG. 2b shows an Composite Object 6, an Aspect Category 19a that Aspect 6a belongs to, and an Aspect Type 8 for the Aspect 6a according to an embodiment of the invention. The Aspect Type 8 contains a listing of all Aspect System Objects used by this Aspect, expressed as a class identifier 9 (CLSID) of each ASO and a list of all interface identifiers 7 (IID) for interfaces supported by each ASO. A CLSID, such as CLSID 9, identifies a particular application, and, by this means, associates a function of the Aspect with the application that implements the function.

FIG. 3 shows a Composite Object 10, which includes an interface IUnknown 4a. Also shown is an Aspect System Object 101, which includes another interface IUnknown 4b. FIG. 3 also shows a query 13 for an interface and a reference 103 to an interface 102. From FIG. 3 it is seen that when a client queries the Composite Object 10 for an interface, the reference 103 that is returned comes from the Aspect System Object 101.

The ASO 101 is found through a table look-up using the Aspect Type, as shown in FIG. 2b.

The result of this is that the client querying, for example, Composite Object 10, for a function associated with one of the Aspects of Composite Object 10, does not need to know the identity of the object (or application) for which the interface is being sought, the client simply queries the Composite Object for the function associated with the Aspect. This is in contrast to the standard use of COM, which requires that a client object explicitly knows the identity of the object (or application) for which it is seeking an interface.

A Composite Object is uniquely identified through its object identifier. An Aspect is identified by the object identifier of the Composite Object it is associated with, and a unique aspect identifier. If an object has a representation in different systems it uses the same object identifier in all systems.

Finding an Interface Through a Composite Object According to the Invention

A client of a Composite Object queries the object for an interface. The Composite Object uses the definitions contained by the Aspect Type of the Aspects of the Composite Object to identify the Aspect System Object that implements the requested interface. This ASO is then created and initialized from the Aspect it represents, or, if it is already running, found through a mechanism of locating running objects. A reference to an interface of this ASO is then returned to the client.

Whenever a client interacts with a Composite Object a COM object is instantiated which represents the Composite Object.

See FIG. 2b. The mechanism for finding the Aspect System Object which implements an interface of an Aspect is described thus. When a client queries a Composite Object 6 for an interface, the Composite Object examines its Aspects, including Aspect 6a, through the Aspect Category 19a, for an Aspect Type 8 which lists an ASO Description 8a that contains an interface identifier 7 of the requested interface. From the same ASO Description 8a the class identifier 9 of the Aspect System Object which implements the interface is obtained.

See FIG. 3 which illustrates a request to a Composite Object for an interface. FIG. 3 shows a Composite Object 10 which receives query 13 from a client. The Aspect Type 8 is searched, as shown in FIG. 2b, to find the Aspect System Object class identifier 9. The Aspect System Object 101, if not already running, is created as indicated by process 14 Initialization in FIG. 3. The instantiated Aspect System Object 101 is then queried through the interface IUnknown 4b for a reference to the interface 102, which reference 103 is returned to the client.

Aspect System Objects can be defined to be shared or exclusive. This specifies if a client requests an interface several times for the same Aspect, it will get the same interface reference to the object several times. If an Aspect System Object is shared then only one interface reference with a specific aspect identifier is created in each context (typically per process).

Adding Objects and Functions According to the Invention

The above described mechanism makes it possible to extend the functionality of the control systems by adding Aspects to Composite Objects, where each Aspect brings one piece of functionality. It also allows the implementation of the computerized system to be modularized, because each Aspect is independent from all other Aspects except through the interfaces it supports and utilizes.

In a system that is implemented based on the principles of this invention, a developer adds functionality by adding aspect systems. An aspect system is an application that implements one or more Aspects, thus allowing Aspects instances to be created and added to Composite Objects The aspect system defines (among other things) which COM objects are used to implement the Aspects.

It is also possible to add functionality to an existing aspect system by adding new ASOs to the Aspect type.

Preferred Embodiment

In a preferred embodiment of the present invention, a method to organize Composite Objects after one or more real-world relationships is included, which method is called Structures. Any Composite Object in a system can be arranged in one or more Structures.

For example a number of Composite Objects representing parts of one physical system may be conveniently grouped as a Structure. Composite Objects representing a sensor attached to a blade of a stirring device, the shaft of the stirring device, a temperature sensor in the stirring device and a control unit for the stirrer, etc., may all additionally be identified as belonging to a particular Agitator Structure.

The Structure itself is represented as an entity that is separate from the included Composite Objects. Each node in a Structure is represented by a structure Aspect of the Composite Object that is "placed" in that node.

The use of Structures means that relations between Composite Objects are represented by Aspects of the Composite Objects. This allows a Composite Object to be represented in multiple Structures and even in multiple positions within one particular Structure. Structures allow Composite Objects to be organized and allows functions such as inheritance, sorting and grouping to be naturally defined.

A first object can inherit through a known mechanism of general inheritance by being defined as a child of a second object. The child (first object) then inherits those aspects from its parent object (second object) that are marked as to-be-inherited.

The present invention defines an additional and new method of inheritance. Aspects refer to Aspect Categories, and through categories to Aspect Types. Aspect systems, Aspect Types and Aspect Categories are all represented as Composite Objects. By placing additional Aspects in an Aspect Category and marking these Aspects as to-be-inherited, these aspects are inherited to all Composite Objects to which any Aspect of that particular Aspect Category is added.

Figure 4:
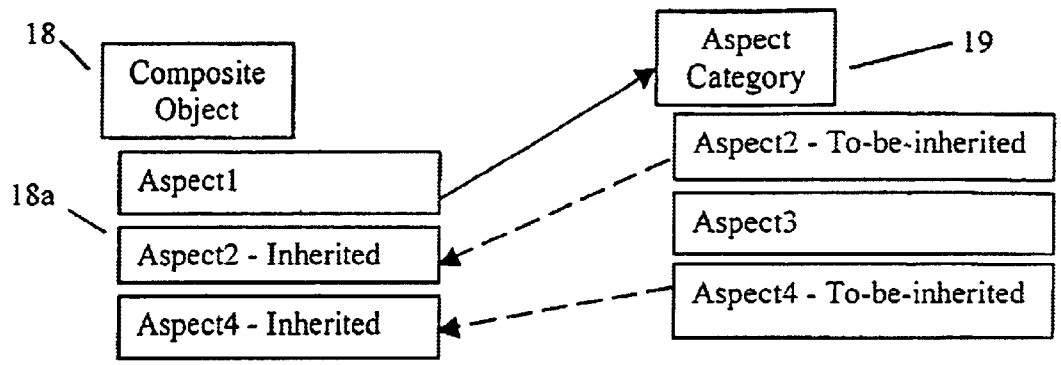
FIG. 4 shows schematically a scheme of inheritance for Aspects of a Composite Object according to another embodiment of the present invention.

This form of inheritance is illustrated summarily in FIG. 4. A Composite Object 18 is a container for some Aspects, including Aspect1. Aspect1 refers to an Aspect Category 19. In the Aspect Category 19 Aspect2 and Aspect4 are marked as to-be-inherited. Because Composite Object 18 contains at least one Aspect from Aspect Category 19, which in this example is Aspect1, Composite Object 18 will inherit all Aspects in Category 19 that are marked as to-be-inherited. The Composite Object 18 thus inherits Aspect2 and Aspect4 automatically by means of the to-be-inherited indicator on those Aspects in the Aspect Category 19.

The mechanism described above works recursively.

Figure 5:
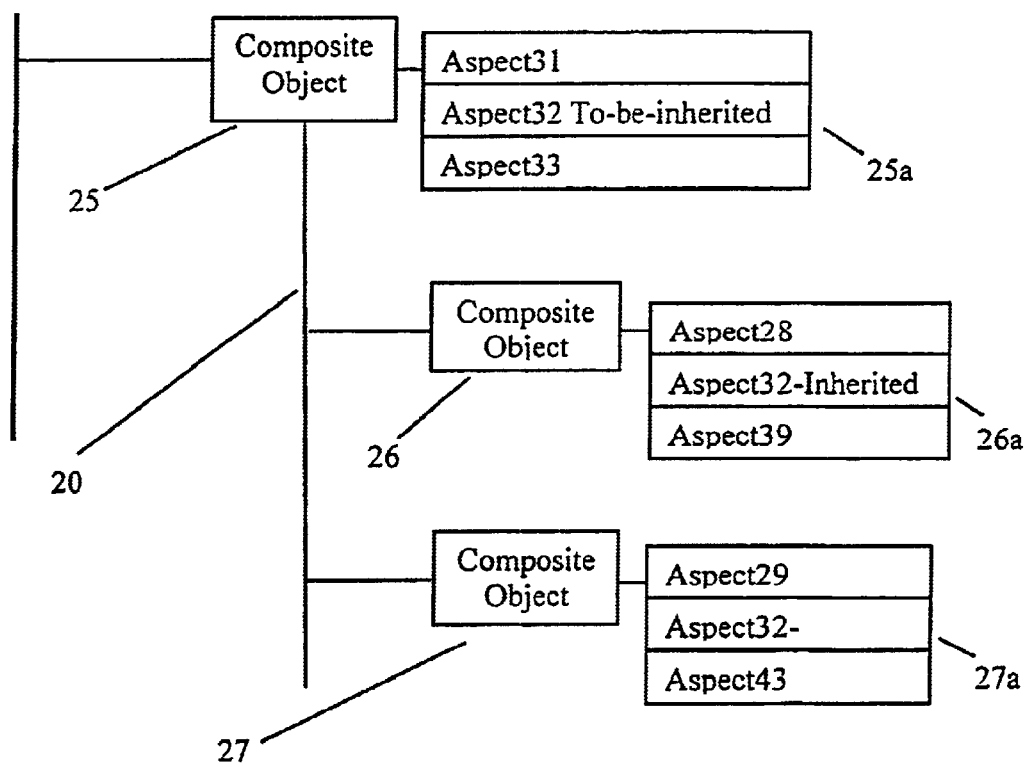
FIG. 5 shows schematically inheritance for Aspects of a Composite Object in the same Structure according to a preferred embodiment of the present invention.

The present invention also defines a another new method of inheritance, shown schematically in FIG. 5. A Structure 20 includes a first Composite Object 25 and two other Composite Objects 26, 27 that are organized in the same Structure. Composite Objects 26, 27 automatically inherit Aspect32 from Composite Object 25 because Aspect32 is marked as to-be-inherited by Composite Objects when organized subordinated in the same Structure. This method of organization within a Structure may be based on any relationship, typically one that reflects a real world function, and is not limited to descriptions such as a class in a hierarchy. The marker for "to-be-inherited-within-the-same-Structure" is placed in the Aspect Category of the respective Aspects.

A system employing a method according to the present invention may also take the form of a distributed system because it is designed using methods that facilitate communication between, and execution of, applications running on computers in a distributed system. Distributed system here means a system that is spread over a plurality of computers, computer systems, computer networks, intelligent and non-intelligent devices that are arranged with communication devices so that each part of the system may communicate with any other part.

It is within the scope of the claims of the present invention to include computerized systems that comprise any communication means or combination thereof, including but not limited to direct hard-wired links, networks, intranets, the internet, public or private telephone lines, radio links, infrared links or links using optic fibers.

What is claimed is:

1. A method to integrate an application in a computerized system for control of a real world object, which system comprises an Object Request Broker that provides access to said application through an interface, comprising the steps of:
   representing said real world object as a Composite Object, which contains an Aspect;
   representing a facet of said real world object as the Aspect of the Composite Object;
   associating said application with the Aspect by means of a first reference;
   enabling a query to a Composite Object for a function associated with the Aspect;
   obtaining through the Composite Object a second reference to the interface of said application which implements the function.

2. A method according to claim 1, wherein the Composite Object provides information about the Aspect that is associated with the Composite Object.

3. A method according to claim 1, wherein the interface accessed through said Object Request Broker is implemented by an Aspect System Object.

4. A method according to claim 1, wherein the Aspect belongs to an Aspect Category which contains a reference to an Aspect Type first reference to an Aspect System Object.

5. A method according to claim 1, wherein the first reference comprises a class identifier.

6. A method according to claim 3, wherein the Aspect System Object is arranged to provide said interface via said Object Request Broker an in-process, or local, or remote.

7. A method according to claim 1, wherein said Object Request Broker complies with COM.

8. A method according to claim 4, wherein Aspect inheritance is described in the Aspect Category to which the Aspect belongs.

9. A method according to claim 1, wherein the Composite Object is organized in a Structure.

10. A method according to claim 9, wherein the Composite Object is organized by being placed in more than one position in the Structure.

11. A method according to claim 9, wherein the Composite Object is organized by being placed in more than one Structure.

12. A method according to claim 9, wherein the Aspect of a first Composite Object in a Structure marked as "to-be-inherited-within-the-same-Structure" is inherited by at least one second Composite Object subordinated in the same Structure.

13. A method according to claim 1, wherein at least one additional function is added by the additional steps comprising:
   defining an additional Aspect system containing an Aspect System Object;
   describing an Aspect Type that is implemented in the additional Aspect system; and
   listing in the Aspect Type the Aspect System Object which is accessed through said Object Request Broker.

14. A system for computerized control of a real world object, having an application and an Object Request Broker that provides access to said application through an interface comprising:
   a Composite Object representing said real world object,
   an Aspect of the Composite Object, which represents a facet of said real world object, being associated with said application by means of a first reference, where the Composite Object is a container for the Aspect and is arranged to provide a second reference to said interface of said application.

15. A system according to claim 14, wherein the Composite Object provides information about the Aspect that is associated with the Composite Object.

16. A system according to claim 14, wherein said interface accessed through said Object Request Broker is implemented by an Aspect System Object.

17. A method according to claim 14, the first reference (9) to the Aspect System Object (101) is a class identifier.

18. A system according to claim 14, wherein the Aspect belongs to an Aspect category which contains a reference to an Aspect Type, which Aspect Type contains a reference to an Aspect System Object.

19. A system according to claim 16, wherein the Aspect System Object is arranged to provide said interface which via said Object Request Broker is in-process, or local, or remote.

20. A system according to claim 14, wherein said Object Request Broker complies with COM.

21. A system according to claim 14, wherein Aspect inheritance is described in an Aspect Category to which the Aspect belongs.

22. A system according to claim 14, wherein the Composite Object is organized in a Structure.

23. A system according to claim 22, wherein the Composite Object is organized by being placed in more than one position in the Structure.

24. A system according to claim 22, wherein the Composite Object is organized by being placed in more than one Structure.

25. A system according to claim 22, wherein the Aspect of a first Composite Object in a Structure marked "to-be-inherited-within-the-same-Structure" is inherited by at least one second Composite Object organized subordinated in the same Structure.

26. A system according to claim 14, wherein at least one additional function may be added comprising:
   an additional Aspect system containing one or more Aspect System Objects;
   one or more Aspect types that are implemented in the further Aspect system; and
   a listing in each Aspect type of one or more Aspect System Objects (101) which may be accessed through said Object Request Broker.

27. A computer program product containing software code means loadable into the internal memory of a computer in a computerized system, comprising:
   means to make said computer provide a Composite Object capable of representing a real world object, which Composite Object is a container for an Aspect, provide the Aspect capable of representing a facet of the real world object, where the Aspect is associated with an application by means of a first reference, and to return upon request a second refernce to an interface of the application, which interface is accessible through an Object Request Broker.

28. A computer program product according to claim 27, wherein the Composite Object provides information about the Aspect that is associated with the Composite Object.

29. A computer program product according to claim 27, wherein the interface (102) accessed through the Object Request Broker is implemented by an Aspect System Object (101).

30. A computer program product according to claim 27, wherein each Aspect belongs to an Aspect Category which contains a reference to an Aspect Type, which Aspect Type contains a reference to an Aspect System Object.

31. A computer program product according to claim 27, wherein the first reference to the Aspect System Object is a class identifier.

32. A computer program product according to claim 29, wherein the Aspect System Object is arranged to provide said interface which via said Object Request Broker is in-process, or local, or remote.

33. A computer program product according to claim 27, wherein the Object Request Broker complies with COM.

34. A computer program product according to claim 30, wherein Aspect inheritance is described in an Aspect Category.

35. A computer program product according to claim 27, wherein the Composite Object is organized in a Structure.

36. A computer program product according to claim 35, wherein the Composite Object is organized by being placed in more than one position in a Structure.

37. A computer program product according to claim 35, wherein the Composite Object is organized by being placed in more than one Structure.

38. A computer program product according to claim 35, the Aspect of a first Composite Object in a Structure marked "to-be-inherited-within-the-same-Structure" is inherited by at least one second Composite Object organized subordinated in the same Structure.

39. A computer program product according to claim 27, comprising:
first means for providing at least one further Aspect system containing one or more Aspect System Objects;
second means for providing one or more Aspect Types that are implemented in the further Aspect system; and
third means for providing a listing in each Aspect Type of one or more Aspect System Objects which may be accessed through the Object Request Broker.

40. A computer program product according to claim 27, wherein the program is embodied on a computer readable medium.

41. Use of a system according to claim 14, for controlling a real world object located in an industrial or commercial location, a residence or a home.

42. Use of a computer program product according to claim 27 for controlling a real world object located in an industrial or commercial location, a residence or a home.

43. A method to integrate an application in a computerized system for control of a real world object, wherein software means represents the real world object, a first reference to an interface is associated with the software means; and an object Request Broker provides access to said application through an interface comprising the steps of:
configuring said software means as a Composite Object which contains an Aspect;
representing a function of said real world object as the Aspect;
associating said application with the Aspect by means of a second reference;
enabling a query by means of the first reference to the Composite Object for the function associated with the Aspect;
obtaining through the Composite Object a third reference to the interface of said application which implements the function.

44. A method to integrate an application in a computerized system for control of a real world object, which system comprises an Object Request Broker that provides access to said application through an interface, comprising the steps of:
representing said real world object as a Composite Object, which contains an Aspect;
representing a facet of said real world object as the Aspect of the Composite Object;
associating said application with the Aspect by means of a first reference;
enabling a query to a Composite Object for a function associated with the Aspect of the Composite Object;
obtaining through the Composite Object a second reference to the interface of said application which implements the function; and
wherein the Composite Object is organized in a Structure; and
the Aspect of a first Composite Object in a Structure marked as "to-be-inherited-within-the-same-Structure" is inherited by at least one second Composite Object subordinated in the same Structure.

45. A system for computerized control of a real world object, having an application and an Object Request Broker that provides access to said application through an interface comprising:
a Composite Object representing said real world object, an Aspect of the Composite Object, which represents a facet of said real world object, being associated with said application by means of a first reference, where the Composite Object is a container for the Aspect and is arranged to provide a second reference to said interface of said application;
the Composite Object is organized in a Structure; and
the Aspect of a first Composite Object in a Structure marked "1" is inherited by at least one second Composite Object organized subordinated in the same Structure.

46. A computer program product containing software code means loadable into the internal memory of a computer in a computerized system, comprising:
means to make a computer:
provide a Composite Object capable of representing a real world object, which Composite Object is a container for an Aspect;
provide the Aspect capable of representing a facet opf the real world object, where the Aspect is associated with an application by means of a first reference, and
to return upon request a second refernce to an interface of the application, which interface is accessible through an Object Request Broker;
wherein the Composite Object is organized in a Structure; and
the Aspect of a first Composite Object in a Structure marked "to-be-inherited-within-the-same-Structure" is inherited by at least one second Composite Object organized subordinated in the same Structure.

* * * * *